US008021738B2

(12) United States Patent
Yaver et al.

(10) Patent No.: US 8,021,738 B2
(45) Date of Patent: Sep. 20, 2011

(54) LINER COMPONENT FOR USE IN MINING AND QUARRYING INDUSTRIES

(75) Inventors: Imam Syed Yaver, West Bengal (IN); Gour Das, West Bengal (IN); Paul Biswadeep, West Bengal (IN)

(73) Assignee: Tega Industries Limited, Kolkata (IN)

( * ) Notice: Subject to any disclaimer, the term of this patent is extended or adjusted under 35 U.S.C. 154(b) by 277 days.

(21) Appl. No.: 12/085,908

(22) PCT Filed: Aug. 22, 2006

(86) PCT No.: PCT/IN2006/000301
§ 371 (c)(1), (2), (4) Date: Jun. 2, 2008

(87) PCT Pub. No.: WO2007/063554
PCT Pub. Date: Jun. 7, 2007

(65) Prior Publication Data

US 2010/0227195 A1 Sep. 9, 2010

(30) Foreign Application Priority Data

Dec. 2, 2005 (IN) ................................ 1101/KOL/05

(51) Int. Cl.
*B32B 5/16* (2006.01)
*B65G 11/16* (2006.01)

(52) U.S. Cl. ........... 428/119; 428/55; 428/137; 198/956

(58) Field of Classification Search .................. 428/119, 428/49, 55, 56, 67, 137; 241/DIG. 30, 182; 198/956; 193/2 R, 33
See application file for complete search history.

(56) References Cited

U.S. PATENT DOCUMENTS

| | | | | |
|---|---|---|---|---|
| 3,350,832 | A | 11/1967 | Persson | |
| 3,883,080 | A | 5/1975 | Andersson | |
| 3,953,950 | A | 5/1976 | Sudyk | |
| 5,055,336 | A | 10/1991 | Davis | |
| 5,472,148 | A * | 12/1995 | Schaeffer | 241/183 |

FOREIGN PATENT DOCUMENTS

| | | | |
|---|---|---|---|
| AU | 549 123 | B2 | 1/1986 |
| CA | 2505938 | A1 | 11/2006 |
| CN | 1880196 | A | 12/2006 |
| GB | 1 075 372 | A | 7/1967 |
| JP | 09 010613 | A | 1/1997 |
| KR | 2004 0031942 | A | 4/2004 |
| KR | 2004 0036266 | A | 4/2004 |
| KR | 2004 0063744 | A | 7/2004 |

OTHER PUBLICATIONS

International Search Report dated Feb. 21, 2007, issued in Application No. PCT/IN2006/000301.

First Examination Report from Indian Patent Office dated Jun. 23, 2009 issued in counterpart Indian Patent Application No. 1101/KOL/2005-B.

* cited by examiner

*Primary Examiner* — Alexander Thomas
(74) *Attorney, Agent, or Firm* — Venable LLP; Robert Kinberg; Leigh D. Thelen

(57) ABSTRACT

There is provided a wear and impact resistant liner component (1) for use in mining and quarrying industries comprising a rubber matrix rigidly supported on a steel plate (2), said rubber matrix having been provided with a plurality of steel strips (3) spaced apart from each other.

7 Claims, 2 Drawing Sheets

LINER COMPONENT FOR USE IN MINING AND QUARRYING INDUSTRIES

FIELD OF THE INVENTION

This invention relates to liner component for use in mining and quarrying industries.

This invention further relates to wear and impact resistant liner component for handling lumpy ore/materials in mining and quarrying industries.

BACKGROUND OF THE INVENTION AND PRIOR ART

The materials that are used to withstand load and consequently wears, are presently rubber, cast, white iron alloys and various grades of abrasion resistant liner. However, no suitable material is known, which can be used for resistance of lumpy ore/materials. Therefore, the need exists to provide materials for use in liner components, which are abrasion resistant and impact resistant to lumpy materials and are also suitable rigid.

OBJECTS OF THE INVENTION

It is an object of this invention to provide liner components, which are abrasion resistant, wear resistant and rigid.

It is another object of this invention to provide liner components, which have greater life and are thus economical.

A further object of this invention is to provide liner components, which can save the mother plates of the chutes or hoppers from damage.

These and other objects of the invention will be apparent from the ensuing description.

BRIEF STATEMENT OF THE INVENTION

According to this invention, there is provided a wear and impact resistant liner component for use in mining and quarrying industries comprising a rubber matrix rigidly supported on a steel plate, said rubber matrix having been provided with a plurality of steel strips spaced apart from each other.

The other features of the invention are as follows:

(a) the said steel plate is provided with a plurality of pilot holes designed for fixing the liner component with the mother plates of chutes/hoppers used for handling solid materials.

(b) counter holes are provided in the rubber matrix for the purposes of fixing and plugging.

(c) the said steel strips are vertically inserted into the rubber matrix.

(d) in one modification, the lower ends of the steel strips are supported on the steel plate.

(e) In another modification, the lower ends, of the steel strips lie close to and above the said steel plate.

(f) the number of and spacing apart of the steel strips are designed based on the lump size of the material being handled.

BRIEF DESCRIPTION OF THE INVENTION ACCOMPANYING DRAWINGS

The invention is now described with reference to the accompanying drawings in which FIG. 1 shows a plan view of the liner of the invention.

DETAILED DESCRIPTION OF THE DRAWINGS

Figure 1:
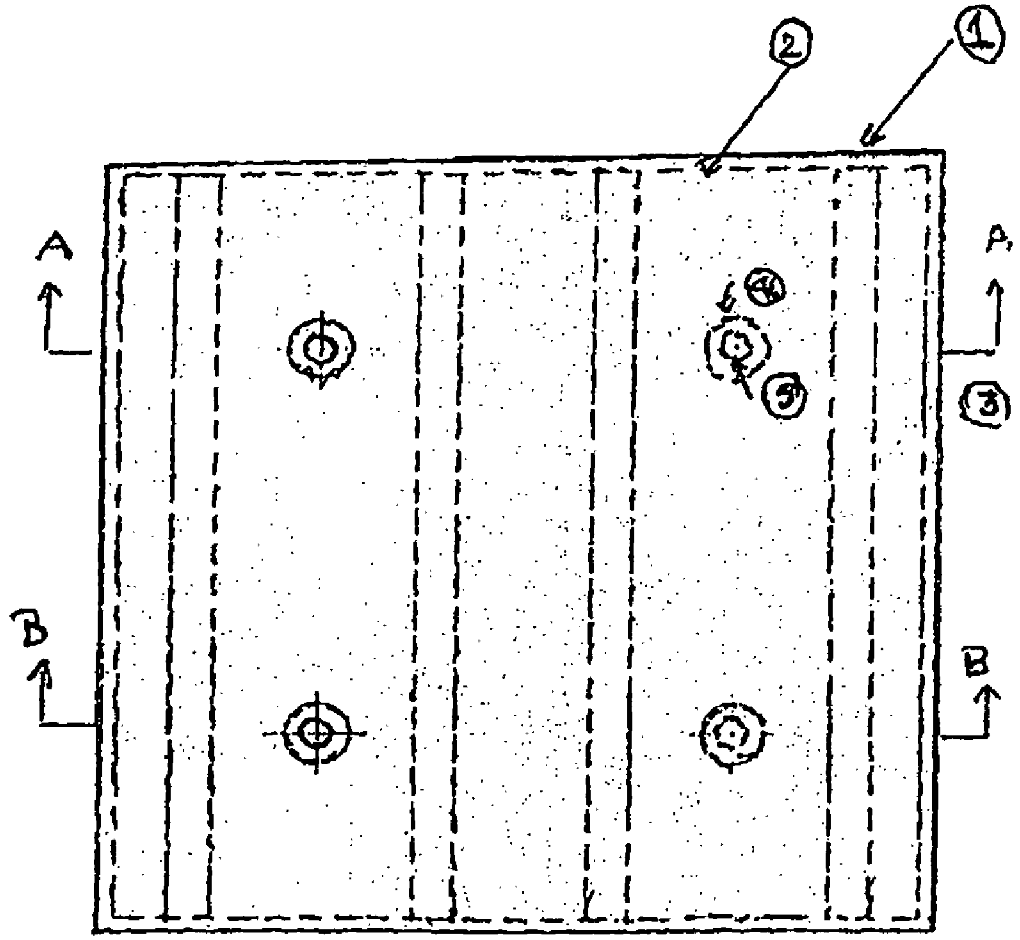

It will be seen from FIG. 1, that the liner (1) is made of wear and impact resistant rubber has rubber portion (2) and longitudinally provided steel strips (3) shown in dotted lines. There are thus provided a plurality of such steel strips at pre selected places according to requirements and exigencies of the situation. The manner in which these steel strips are provided are shown in more detail in FIGS. 2, (3) and (4). FIG. 1 also shows in dotted lines counter holes (4) provided on the rubber for fixing and plugging.

There are also pilot holes (5) on the backing steel plate more clearly shown in the other figures. for fixing with mother plates of chute/hopper which are the equipment of handling materials, and the main equipments on which the components according to the invention are used.

Figure 2:
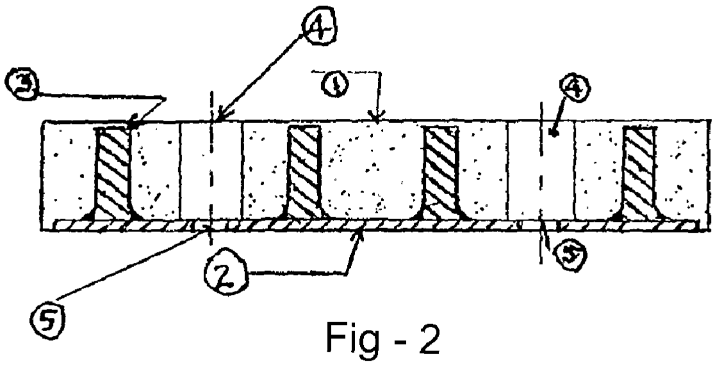
FIG. 2 shows a part sectional view A-A of one type of the liner of the invention showing steel strips into the rubber and supported on a backing steel plate.

FIG. 2 shows an embodiment of the invention in front cross section. It shows the rubber portion (1), backing steel plate (2), vertically inserted steel strips (3) fixed to the steel plate and supported on the same. This figure also shows the counter holes (4) and pilot holes (5) clearly.

Figure 3:
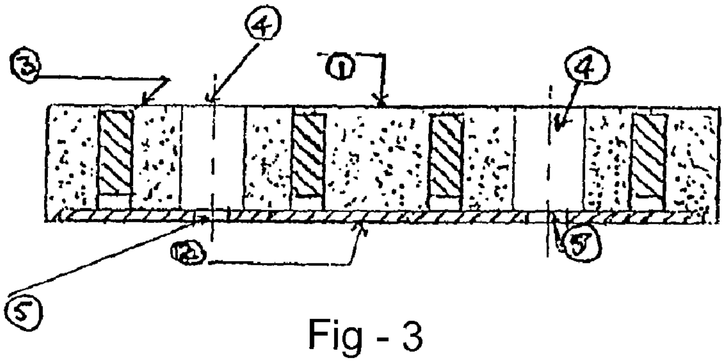
FIG. 3 shows a part sectional view B-B of another type of the liner of the invention showing steel-strips inserted into the rubber, short of the backing steel plane

FIG. 3 is slightly different from FIG. 2 in that the steel strips are terminated a little distance away from the steel plate and are thus not supported on the steel backing plate.

Figure 4:
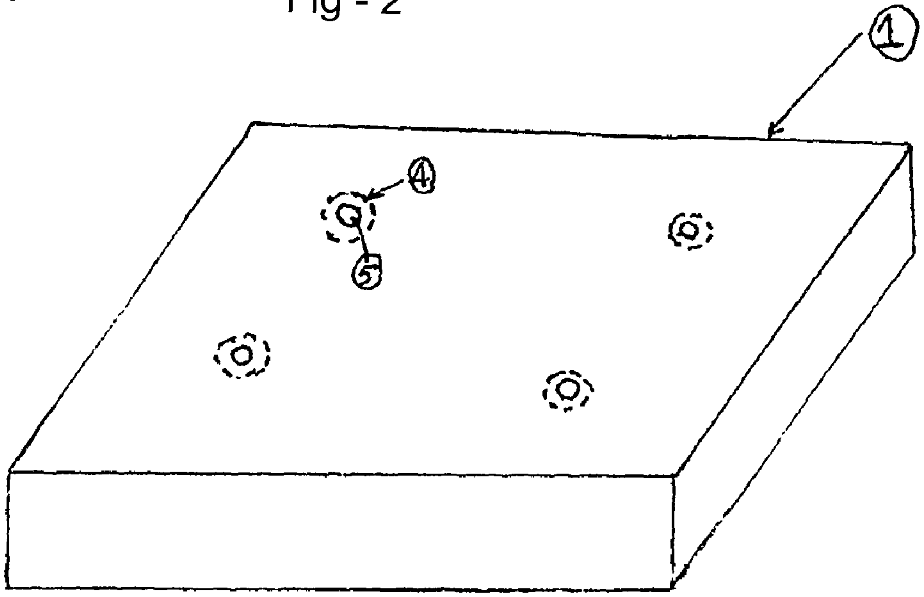
FIG. 4 shows a part isometric view of the liner.

FIG. 4 is a part isometric view of FIG. 2.

The components are mainly used for resistance to lumpy ore/materials up to 3-4 ton lumps with velocity. They ensure greater life compared to other liners as on date. They save the mother plates of chutes and hoppers from simultaneous damage and reduce the overall cost.

Principle of the Working of the Liner of the Invention.

After the lumps on hit the steel-strips, the acting force will be divided into various directions. Only perpendicular force will be on the steel strips and other shearing forces will be by rubber due to its dampening properties and will resume its original shape due to its elasticity. There will be little or no wear and no permanent deformation.

The total impact force is thus neither acted on the steel strips nor on the rubber. Steel-strips and rubber both take the share of forces. In case of floated steel strips with rubber, perpendicular force will also be transmitted to rubber.

Steel strips ensure that the rubber is not cut through during operation.

We claim:

1. A wear and impact resistant liner component for use in mining and quarrying industries comprising a rubber matrix rigidly supported on a flat steel plate, said rubber matrix including a plurality of steel strips spaced apart approximately parallel from each other, wherein the steel strips extend substantially perpendicular to the flat steel plate and substantially, but not completely, through the rubber matrix.

2. A wear and impact resistant liner component as claimed in claim 1 wherein the flat steel plate includes a plurality of pilot holes arranged to fix the liner component with mother plates of chutes/hoppers used for handling solid materials.

3. A wear and impact resistant liner component as claimed in claim 1 wherein the rubber matrix includes counter holes for purposes of fixing and plugging.

4. A wear and impact resistant liner component as claimed in claim 1 and wherein the steel strips are vertically inserted into the rubber matrix.

5. A wear and impact resistant liner component as claimed in claim 4 wherein steel strips include lower ends supported on the steel plate.

6. A wear and impact resistant liner component as claimed in claim 4 wherein the lower ends of the steel strips lie close to and above the said steel plate.

7. A wear and impact resistant liner component as claimed in claim 6 wherein the number of and spacing apart of the steel strips are designed based on the lump size of the material being handled.

* * * * *

UNITED STATES PATENT AND TRADEMARK OFFICE

CERTIFICATE OF CORRECTION

PATENT NO. : 8,021,738 B2
APPLICATION NO. : 12/085908
DATED : September 20, 2011
INVENTOR(S) : Yaver et al.

It is certified that error appears in the above-identified patent and that said Letters Patent is hereby corrected as shown below:

On the Title page item:

(75) Inventors:

Imam Syed Yaver, ~~West Bengal~~ Kolkata (IN);
Gour Das, ~~West Bengal~~ Kolkata (IN);
Paul Biswadeep, ~~West Bengal~~ Kolkata (IN);

Signed and Sealed this
Sixth Day of December, 2011

David J. Kappos
*Director of the United States Patent and Trademark Office*